F. JOHANNSMEYER.
ELECTRIC RESISTANCE THERMOMETER.
APPLICATION FILED AUG. 16, 1912.
1,191,703.
Patented July 18, 1916.
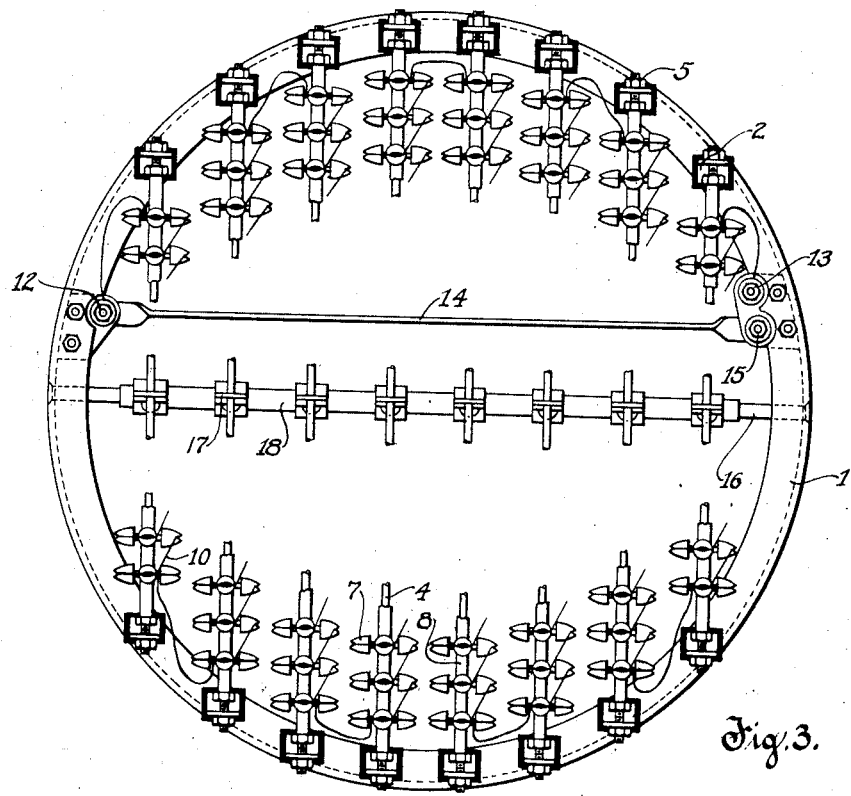
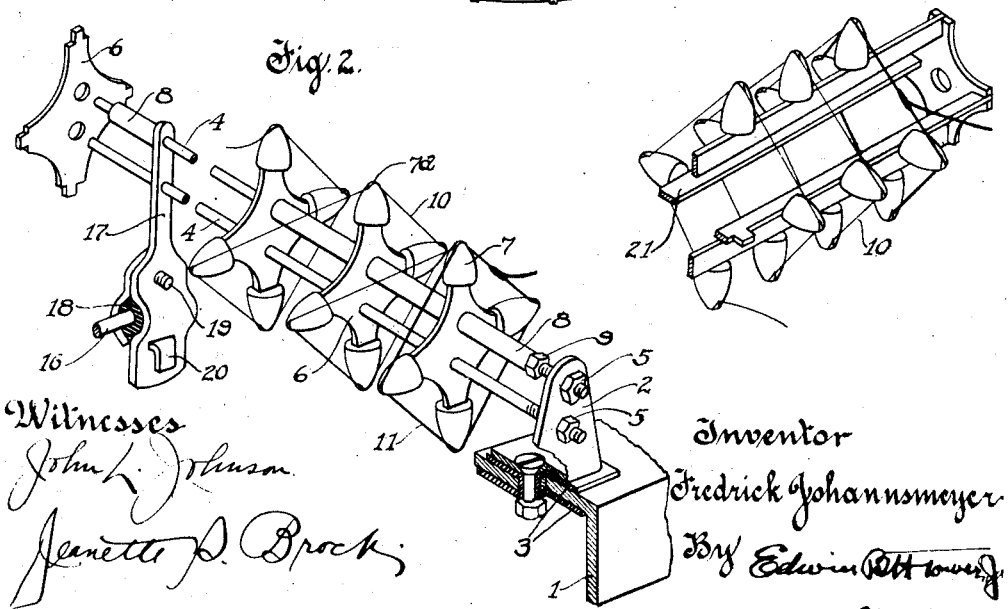
Witnesses
John L. Johnson
Jeanette D. Brock
Inventor
Fredrick Johannsmeyer
By Edwin Ott
Attorney

UNITED STATES PATENT OFFICE.

FREDRICK JOHANNSMEYER, OF MILWAUKEE, WISCONSIN, ASSIGNOR TO CARL C. THOMAS, OF MADISON, WISCONSIN.

ELECTRIC-RESISTANCE THERMOMETER.

1,191,703.  Specification of Letters Patent.  Patented July 18, 1916.

Application filed August 16, 1912. Serial No. 715,431.

*To all whom it may concern:*

Be it known that I, FREDRICK JOHANNSMEYER, a citizen of the United States, residing at Milwaukee, in the county of Milwaukee and State of Wisconsin, have invented new and useful Improvements in Electric-Resistance Thermometers, of which the following is a full, clear, concise, and exact description, reference being had to the accompanying drawing, forming a part of this specification.

My invention relates to electric resistance thermometers.

A meter has been developed for measuring the flow of steam, air and gases, in which two electric thermometers are arranged in a circuit, one on each side of a heater, to measure the difference in temperature of the gas before and after it passes the heater. My resistance thermometer is an improvement over prior thermometers of this kind and is adapted particularly for use in such a meter, although not limited to such use.

One of the objects of the invention is to provide an improved electric resistance thermometer which will offer a minimum resistance to the flow of fluid being measured.

Another object is to provide an improved resistance thermometer in which the resistance wire will be uniformly distributed over the area inclosed by the frame and will be thoroughly insulated from said frame.

Another object is to provide an improved resistance thermometer in which the resistance wire is supported with a minimum amount of wire in contact with the supporting means.

Other objects and advantages of the invention will hereinafter appear.

In accomplishing these objects a resistance thermometer is provided in which the resistance element or wire has a comparatively high resistance and small mass and is capable of resisting the action of gases, the supporting structure for said wire being of minimum mass and the wire being mounted thereon in such a manner that only short lengths of wire are in contact with the supports, the wire being well insulated from the supporting frame and uniformly distributed over the area inclosed thereby.

In the accompanying drawings I have illustrated several embodiments of my invention.

Figure 1 is a plan view of a unit embodying the invention, the central portion of the resistance wire and supporting means therefor being omitted in order to show the terminals and reinforcing bar. Fig. 2 is a perspective view of a section of the supporting frame for the wire. Fig. 3 is a perspective view of a modified construction of a supporting frame.

The resistance thermometer is preferably arranged in the form of a screen or grid of circular outline adapted to fit within a conduit or pipe and having a resistance wire so disposed as to be affected by substantially all parts of the flowing current of gas.

The support 1, which is preferably circular, consists of a frame having an angle section, one flange of the angle section forming a convenient mounting for the supports 2 and the other flange acting as a reinforcement and also as a bolting flange for supporting the frame in the conduit.

The supports 2 which are preferably of metal are secured to and suitably insulated from the supporting frame, as shown at 3. The supports are arranged in pairs, each pair carrying preferably two rods or studs 4, suitably secured thereto, as for example, by nuts 5. A plurality of metallic supports or punchings 6 are strung along the rods 4. These punchings are provided preferably with four projecting arms, each of which carries an insulating tip 7 of conical outline, said insulators being made preferably of glass sealed to said arms by a suitable binding material. The punchings are separated by suitable spacers 8 and are secured by nuts 9, which, being independent of the nuts 5, enable each element to be made up before being fastened to the main frame. Said main frame when completed is strong, light and presents a very small projected area to the flowing stream of gas.

The resistance wire 10 is wound about the support in a manner clearly shown in Fig. 2, the individual turns of the wire being in parallel planes except where the wire crosses from one punching to the next. Said wire is preferably secured in place by sealing it in the small groove or slot 7ª in the end of each insulator, the sealing being readily accomplished by dipping the support in some coating material, for example, bakelite.

The resistance wire carried by each support is connected at opposite ends thereof to the wire of a neighboring support so that the effect of the thermometer as a whole is that of one continuous resistance wire. Suitable terminals are provided for the ends of the resistance wire on each support, said ends being soldered to a heavier wire 11 which is wound around the insulators on the last punching. The heavier wire 11 serves to electrically connect the wires of adjacent supports and is also used as a means for connecting the ends of the resistance to the terminals 12 and 13.

The terminal 12 is connected by a conductor rod 14 to a binding post 15 located adjacent the other terminal 13. In this manner the two terminals of the device are brought together so that the connection of the same is facilitated.

In certain large thermometers I find it desirable to provide some means for preventing distortion or vibration of the supports. In Figs. 1 and 2 I have illustrated a transversely extending rod 16 which is supported at its ends in suitable openings in the ring 1, and carries a plurality of vertical bracing members 17. These members 17 are preferably insulated from the rod 16 by means of suitable insulation 18. These members are each preferably formed of two pieces of metal secured together on opposite sides of the rod 16, as, for instance, by a screw 19, on one side and an extension 20 on the other side formed on one of the members and protruded through an opening in the other member and then bent over thereon to lock the same in position. As illustrated, each of the members 17 is provided with perforations adapted to receive the rods 4.

The supporting elements are preferably arranged parallel as shown in Fig. 1. They may be spaced equal distances apart or they may be arranged in any other suitable manner to meet the requirements.

In Fig. 3 I have illustrated an alternative supporting construction in which light metal strips 21 are employed, the insulators 7 being carried by these strips. Said strips are supported at their ends in groups of two or more. I preferably employ four such strips, as shown in this figure, the insulators being turned outward from a common center so that the resistance wire 10 may be wound about them in the manner shown. With this arrangement the wire may be wound more nearly in helical form than in the first arrangement described. In either case the wire will remain in position when wound until it can be sealed.

In both the above arrangements the resistance wire is insulated from its immediate support and the parallel supports as a whole are insulated from the supporting ring.

The creepage resistance, that is, the resistance over the surface of the insulators from the wire to the punchings, is high, due to the conical shape of the insulator and due also to the small area of the punching in contact with the insulator. The entire thermometer after completion is dipped in a suitable insulating solution, such as bakelite, which very materially increases creepage resistance and has an important influence in protecting the metal parts from the action of certain gases.

The resistance offered by the grid as a whole to the moving current of gas is a minimum and the arrangement of the parts and the material employed is such that neither the blast action of the gas nor its chemical action, nor its moisture content, will have an appreciable effect upon the efficient operation of the thermometer or cause deterioration thereof.

It is to be understood, of course, that the invention is not limited to the details shown and described, as various changes may be made therein without departing from the scope of the invention as expressed in the appended claims.

What I claim as new and desire to secure by Letters Patent of the United States is:

1. A resistance thermometer unit comprising a frame adapted to be mounted within a conduit, a plurality of supporting rods carried by said frame and a resistance wire wound about said rods and carried by means mounted on said rods so that the wire is held in spaced relation and insulated from said rods and whereby the wire is distributed substantially uniformly across the area inclosed by the frame with a minimum portion of the wire in contact with the supporting means.

2. A resistance thermometer unit comprising a frame adapted to be mounted in a conduit, a plurality of supporting elements carried by said frame and arranged in substantially the same plane and means on said elements for supporting a resistance wire so that said wire is held spaced from and insulated from said elements and whereby the wire is distributed substantially uniformly over the area included by said frame with a minimum amount of wire in contact with the supporting means.

3. A resistance element comprising a plurality of parallel supporting frames arranged in the same plane and a resistance wire wound around said frames, said frames being built up of flat supporting elements suitably mounted and spaced apart.

4. A resistance thermometer unit comprising a frame, a plurality of supporting rods carried by said frame, a plurality of flat supporting elements mounted on each rod so as to present their edges to the flowing current of fluid and a resistance wire wound about said elements.

5. In a resistance thermometer, a series of flat supporting elements mounted so as to present their edges to the flowing current of fluid, insulators carried by each of said elements, and a resistance wire wound about said supports and carried by said insulators.

6. A supporting device for a resistance wire comprising a supporting rod, a plurality of metallic plates strung thereon and suitably spaced apart, and insulating tips carried by said plates, said tips each having a slot adapted to receive said resistance wire.

7. A supporting device for a resistance wire comprising a plurality of supporting rods, a plurality of metallic plates strung thereon and suitably spaced apart, and insulating tips carried by said plates, said tips each having a notch adapted to receive said resistance wire.

8. In an electric thermometer, a metallic plate having radially extending arms, an insulator carried by each of said arms and sealed thereto and a resistance wire carried by said insulators.

9. In an electric thermometer, a metallic plate having radially extending arms, an insulator carried by each of said arms, said insulators consisting of small glass cones having an outer slot therein substantially parallel to said plate and a resistance wire carried by said insulators.

10. In an electric thermometer, a metallic plate, having radially extending arms, an insulator carried by each of said arms, said insulators consisting of small glass cones having an outer slot therein substantially parallel to said plate, and a wire received in said slots and sealed therein.

11. An electric thermometer having an annular supporting frame, a plurality of parallel supporting devices carried thereon, a stiffening member carried by said frame and extending at right angles to said supports, said stiffening member being connected to a plurality of the latter, a resistance wire wound upon said supports, and terminals for said resistance wire carried by said frame.

In witness whereof, I have hereunto subscribed my name in the presence of two witnesses.

FREDRICK JOHANNSMEYER.

Witnesses:
  J. C. WILSON,
  H. L. ROCKWELL.